(12) United States Patent
Dockery et al.

(10) Patent No.: US 6,361,691 B1
(45) Date of Patent: Mar. 26, 2002

(54) FLOATED FUEL STRAINER ASSEMBLY FOR A FUEL TANK

(75) Inventors: Randall Lee Dockery, Flushing; Dale M. Pickelman, Saginaw; Mitchal A. Peterson, Grand Blanc; David Edward Harris, Birch Run; Bruce Albert Kuehnemund, Flushing, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/465,042

(22) Filed: Dec. 16, 1999

(51) Int. Cl.[7] ............... B01D 35/05; B01D 35/027; F02M 37/10; F02M 37/22
(52) U.S. Cl. ..................... 210/242.1; 210/172
(58) Field of Search ................ 210/172, 122, 210/242.1

(56) References Cited

U.S. PATENT DOCUMENTS

| | | | |
|---|---|---|---|
| 222,140 A | * | 12/1879 | Lindsay |
| 1,826,170 A | * | 10/1931 | Duggan |
| 1,890,984 A | * | 12/1932 | Gulick |
| 2,192,438 A | * | 3/1940 | Gulick |
| 2,318,220 A | * | 5/1943 | Haselwood |
| 2,335,096 A | * | 11/1943 | Zech |
| 2,448,212 A | * | 8/1948 | Dewey |
| 2,508,952 A | * | 5/1950 | Kline |
| 2,663,425 A | * | 12/1953 | Haselwood |
| 2,788,125 A | * | 4/1957 | Webb |
| 4,626,347 A | * | 12/1986 | Neglio |
| 5,146,901 A | * | 9/1992 | Jones |
| 5,293,899 A | * | 3/1994 | Kwon |
| 5,547,568 A | * | 8/1996 | Sasaki |
| 5,665,229 A | * | 9/1997 | Fitzpatrick et al. |
| 5,716,522 A | * | 2/1998 | Chilton et al. |
| 6,170,470 B1 | * | 1/2001 | Clarkson et al. |
| 6,176,133 B1 | * | 1/2001 | Hutter et al. |
| 6,193,885 B1 | * | 2/2001 | Campbell |

* cited by examiner

Primary Examiner—Thomas M. Lithgow
(74) Attorney, Agent, or Firm—Vincent A. Cichosz

(57) ABSTRACT

A floated fuel strainer assembly for a fuel tank in a vehicle includes a strainer adapted to be connected to an inlet of either one of a fuel pump and fuel reservoir disposed in the fuel tank. The floated fuel strainer assembly also includes a float connected to the strainer to elevate the strainer off a bottom of the fuel tank as a fuel level rises in the fuel tank.

20 Claims, 2 Drawing Sheets

FLOATED FUEL STRAINER ASSEMBLY FOR A FUEL TANK

TECHNICAL FIELD

The present invention relates generally to fuel tanks for vehicles and, more particularly, to a floated fuel strainer assembly for a fuel tank of a vehicle.

BACKGROUND OF THE INVENTION

It is known to provide a fuel tank for a vehicle to hold fuel to be used by an engine of the vehicle. In some vehicles, a fuel strainer is provided to filter a certain degree of contaminants in the fuel. The contaminants range in the form of dirt and metal particles, water and air (vapor). Typically, the fuel strainer is located at a bottom of the fuel tank to filter the contaminants from the fuel before the fuel reaches a fuel pump. However, large and heavy contaminants in the fuel are normally found at the bottom of the fuel tank. When too many contaminants gather on or in the fuel strainer, the fuel restrainer becomes restrictive and can cause a failure of the fuel pump.

Therefore, it is desirable to provide a fuel strainer for a fuel tank in a vehicle to strain fuel that is off the bottom of the fuel tank. It is also desirable to provide a fuel strainer for a fuel tank in a vehicle that allows the fuel strainer to filter cleaner fuel and increase the fuel strainer life. It is further desirable to provide a fuel strainer for a fuel tank in a vehicle that reduces restriction of the fuel strainer.

SUMMARY OF THE INVENTION

It is, therefore, one object of the present invention to provide a floated fuel strainer assembly for a fuel tank in a vehicle.

It is another object of the present invention to provide a floated fuel strainer assembly for a fuel tank in a vehicle that allows a fuel strainer to use cleaner fuel therefor.

To achieve the foregoing objects, the present invention is a floated fuel strainer assembly for a fuel tank in a vehicle including a strainer adapted to be connected to an inlet of either one of a fuel pump and fuel reservoir disposed in the fuel tank. The floated fuel strainer assembly also includes a float connected to or disposed within the strainer to elevate the strainer off a bottom of the fuel tank as a fuel level rises in the fuel tank.

One advantage of the present invention is that a floated fuel strainer assembly is provided for a fuel tank in a vehicle. Another advantage of the present invention is that the floated fuel strainer assembly has the ability to strain fuel off the bottom of the fuel tank, which minimizes loading of the fuel strainer with contamination. Yet another advantage of the present invention is that the floated fuel strainer assembly has a longer strainer life through increased surface area. Still another advantage of the present invention is that the floated fuel strainer assembly improves performance at low fuel conditions because the fuel strainer will retrieve fuel farther away from the fuel pump through wicking. A further advantage of the present invention is that the floated fuel strainer assembly improves performance in hot fuel conditions due to fuel vapors rising to the top of the fuel strainer, allowing cooler fuel to enter the fuel pump. Yet a further advantage of the present invention is that the floated fuel strainer assembly improves quality by reducing the chance of a restricted fuel strainer causing fuel pump failure.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
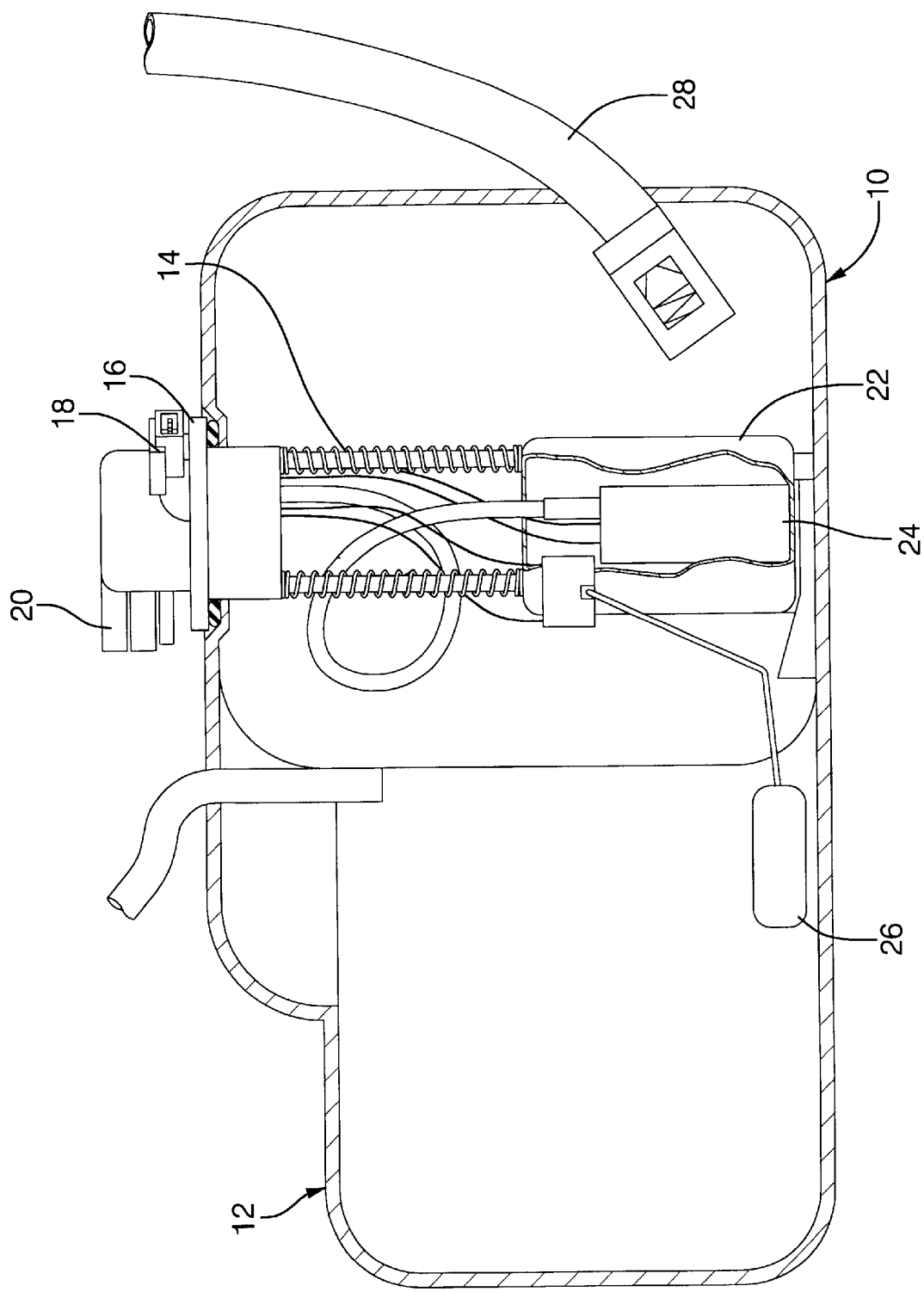
FIG. 1 is a fragmentary elevational view of a floated fuel strainer assembly, according to the present invention, illustrated in operational relationship with a fuel tank of a vehicle.
Figure 2:
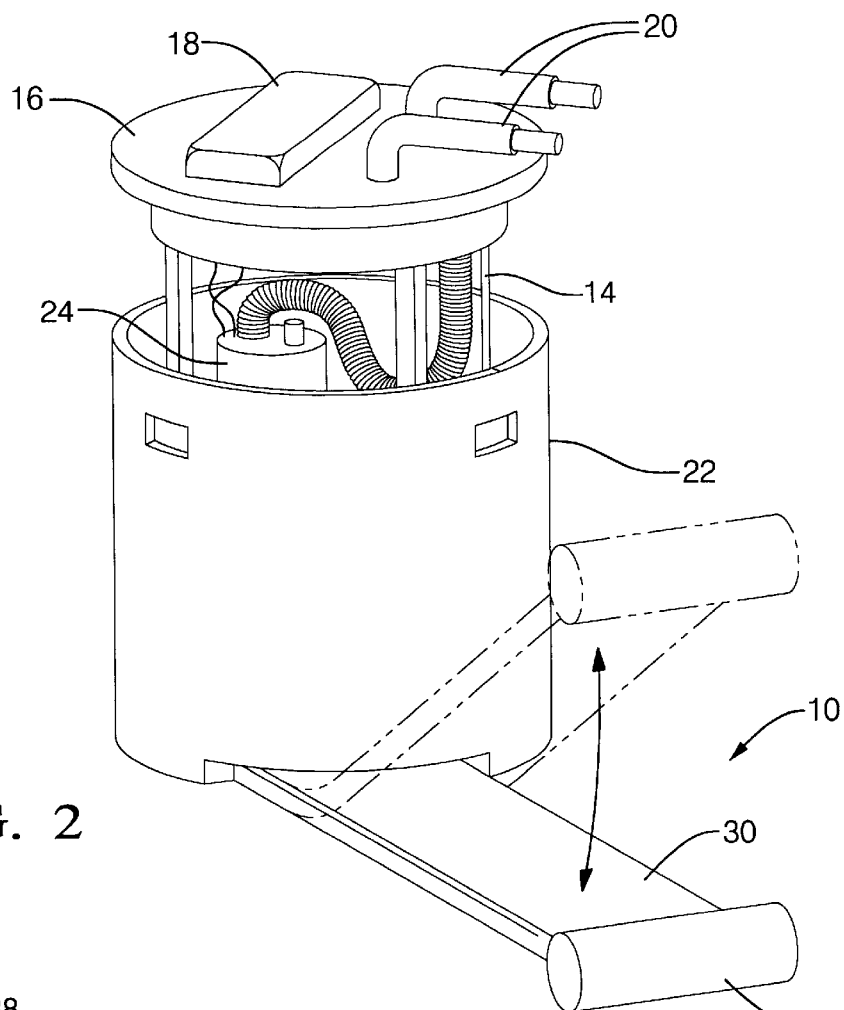
FIG. 2 is a perspective view of the floated fuel strainer assembly of FIG. 1.

Referring to the drawings and in particular FIGS. 1 and 2, one embodiment of a floated fuel strainer assembly 10, according to the present invention, is shown for a fuel tank, generally indicated at 12, in a vehicle (not shown). The fuel tank 12 includes a fuel pump module 14 therein with a removable cover 16 sealed to the top of the fuel tank 12 with an electrical connector 18 and a fuel line outlet connector 20. The fuel tank 12 also includes a fuel reservoir 22, which contains an electrical fuel pump 24 with an inlet (not shown) at a bottom thereof and a float gage 26 to indicate fuel level. The fuel tank 12 also includes a tank filler neck tube 28 having an upper end (not shown) provided with a removable fuel cap (not shown) and mounted in a vehicle body (not shown) of the vehicle. The floated fuel strainer assembly 10 is connected to the inlet of the fuel pump 24. The fuel tank 12 is formed of a metal material or plastic material such as laminated polyethylene with an embedded vapor barrier film. The fuel tank 12 is formed by a twin sheet vacuum thermo-forming, stamped metal or blow molded plastic processes. It should be appreciated that, except for the floated fuel strainer assembly 10, the fuel tank 12 is conventional and known in the art.

Referring to FIGS. 1 and 2, the floated fuel strainer assembly 10 includes a strainer 30 extending longitudinally. The strainer 30 is generally rectangular in shape. The strainer 30 has one longitudinal end connected to the inlet of the fuel pump 24 or fuel module 22 and is positioned to be close to a bottom of the fuel tank 12. The strainer 30 is fabricated from a woven or non-woven filtering material, preferably nylon, to allow fuel to pass therethrough to the fuel pump 24, but prevent certain contaminants from passing therethrough to the fuel pump 24.

The floated fuel strainer assembly 10 has a float 32 connected to the other longitudinal end of the strainer 30. The float 32 is generally cylindrical in shape with a generally circular cross-sectional shape. The float 32 is made of a material being less dense than the fuel such as polyurethane, or blow molded from acetyl or nylon. The float 32 is attached to the strainer 30 by conventional means such as heat stake or snap fasteners. It should be appreciated that the float 32 may have any suitable shape.

In operation, the floated fuel strainer assembly 10 is illustrated in an assembled state as indicated by the solid lines in FIG. 2 in which the strainer 30 and float 32 are near a bottom of the fuel tank 12 during a low fuel condition. As the fuel level rises in the fuel tank 12, the float 32 also rises to elevate the strainer 30 upward and off the bottom of the fuel tank 12 as indicated by the phantom lines in FIG. 2. As a result, the strainer 30 strains cleaner fuel for the fuel pump 24, increasing the life of the fuel pump 24 by minimizing strainer exposure to certain contaminants, such as larger dirt and metal particles, normally found at the bottom of the fuel tank 12. As the fuel level falls in the fuel tank 12, the float 32 also falls and lowers the strainer 30 downward toward the bottom of the fuel tank 12.

Figure 3:
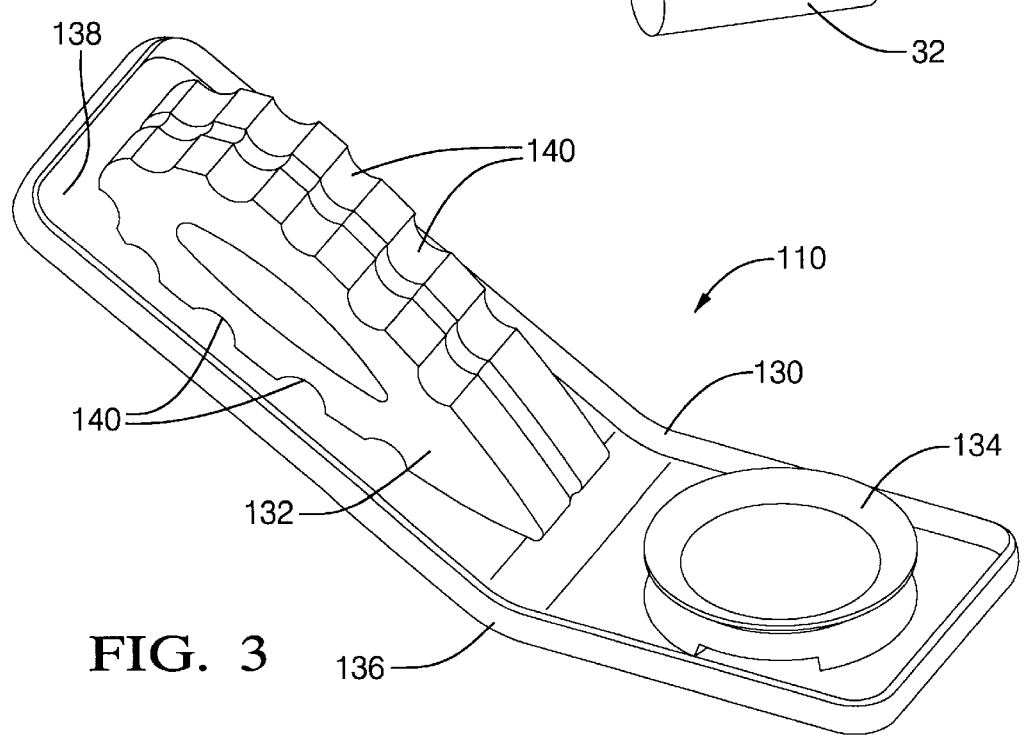
FIG. 3 is a perspective view of another embodiment, according to the present invention, of the floated fuel strainer assembly of FIG. 1.

Referring to FIG. 3, another embodiment 110, according to the present invention, of the floated fuel strainer assembly is shown. Like parts of the floated fuel strainer assembly 10 have like reference numerals increased by one hundred (100). In this embodiment, the floated fuel strainer assembly 110 includes the strainer 130 having an outlet 134 at one longitudinal end. The outlet 134 extends upwardly and is generally circular in shape. The outlet 134 is connected to the inlet of the fuel pump 24 or fuel reservoir 22 by disposing a portion of the outlet 134 through an aperture (not shown) forming the inlet of the fuel pump 24 or fuel reservoir 22. The strainer 130 also has a hinged portion 136 to allow the other longitudinal end to pivot relative to the longitudinal end having the outlet 134. The floated fuel strainer assembly 110 also includes the float 132 connected to an upper surface 138 of the strainer 130 by suitable means such as heat staking or snap fasteners. The float 132 is generally tear-dropped shaped, but may be any suitable shape. Alternatively, the strainer 130 may be made of an upper and lower filtering material with the float 132 encapsulated therebetween or captured inside the strainer 130 by suitable means such as heat sealing the fabric of the filtering material to create a bond. The float 132 has a plurality of flow paths or recesses 140 extending laterally therethrough to allow fuel to pass over the float 132. The operation of the floated fuel strainer assembly 110 is similar to the floated fuel strainer assembly 10, except that the float 132 causes the longitudinal end of the strainer 130 having the float 132 to pivot via the hinge portion 136 relative to the other longitudinal end having the outlet 134. It should be appreciated that the float 132 is used to support the strainer 130.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A floated fuel strainer assembly for a fuel tank in a vehicle comprising:
    a strainer adapted to be connected to an inlet of either one of a fuel pump and fuel reservoir disposed in the fuel tank and adapted to be positioned adjacent a bottom of the fuel tank, said strainer having a first portion adapted to be fixed relative to the bottom of the fuel tank; and
    a float connected to said strainer to elevate a second portion of said strainer off the bottom of the fuel tank as a fuel level rises in the fuel tank.

2. A floated fuel strainer assembly as set forth in claim 1 wherein said strainer extends longitudinally.

3. A floated fuel strainer assembly as set forth in claim 2 wherein said strainer has a first longitudinal end adapted to be connected to the inlet and a second longitudinal end connected to said float.

4. A floated fuel strainer assembly as set forth in claim 1 wherein said strainer is generally rectangular in shape.

5. A floated fuel strainer assembly as set forth in claim 1 wherein said strainer is made of either one of a non-woven and woven material.

6. A floated fuel strainer assembly as set forth in claim 1 wherein said float is made of a material having a density less than a density of the fuel.

7. A floated fuel strainer assembly as set forth in claim 1 wherein said float is generally cylindrical in shape.

8. A floated fuel strainer assembly for a fuel tank in a vehicle comprising:
    a strainer adapted to be connected to an inlet of either one of a fuel pump and fuel reservoir disposed in the fuel tank;
    a float connected to said strainer to elevate said strainer off a bottom of the fuel tank as a fuel level rises in the fuel tank; and
    wherein said strainer extends longitudinally and has a first longitudinal end adapted to be connected to the inlet and a second longitudinal end and a hinge portion disposed between said first longitudinal end and said second longitudinal end.

9. A floated fuel strainer assembly as set forth in claim 8 wherein said float is generally tear-dropped shaped.

10. A floated fuel strainer assembly as set forth in claim 8 wherein said float has a plurality of recesses extending laterally thereacross.

11. A floated fuel strainer assembly as set forth in claim 8 wherein said strainer has an outlet at said first longitudinal end for connection to the inlet.

12. A floated fuel strainer assembly for a fuel tank in a vehicle comprising:
    a strainer extending longitudinally between a first longitudinal end and a second longitudinal end, said first longitudinal end being adapted to be connected to an inlet of either one of a fuel pump and fuel reservoir disposed in the fuel tank and adapted to be positioned adjacent a bottom of the fuel tank, said first longitudinal end adapted to be fixed relative to the bottom of the fuel tank; and
    a float connected to said strainer to elevate said second longitudinal end of said strainer off the bottom of the fuel tank as a fuel level rises in the fuel tank.

13. A floated fuel strainer assembly as set forth in claim 12 wherein said float is connected to said second longitudinal end.

14. A floated fuel strainer assembly as set forth in claim 13 wherein said strainer is generally rectangular in shape.

15. A floated fuel strainer assembly for a fuel tank in a vehicle comprising:
    a strainer extending longitudinally between a first longitudinal end and a second longitudinal end, said first longitudinal end being adapted to be connected to an inlet of either one of a fuel pump and fuel reservoir disposed in the fuel tank;
    a float connected to said strainer to elevate said strainer off a bottom of the fuel tank as a fuel level rises in the fuel tank; and
    wherein said strainer has a hinge portion disposed between said first longitudinal end and said second longitudinal end.

16. A floated fuel strainer assembly as set forth in claim 15 wherein said float is encapsulated between an upper and lower filtering material of said strainer between said hinge portion and said second longitudinal end.

17. A floated fuel strainer assembly as set forth in claim 12 wherein said strainer is made of either one of a non-woven and woven material.

18. A floated fuel strainer assembly as set forth in claim 12 wherein said float is made of a material having a density less than a density of the fuel.

19. A floated fuel strainer assembly as set forth in claim 12 wherein said strainer is generally rectangular in shape.

20. A fuel tank assembly for a vehicle comprising:

a fuel tank having a bottom;

a fuel reservoir disposed in said fuel tank;

a fuel pump disposed in said fuel reservoir;

a floated fuel strainer assembly connected to an inlet of either one of said fuel reservoir and said fuel pump; and said floated fuel strainer assembly comprising a strainer extending longitudinally between a first longitudinal end and a second longitudinal end, said first longitudinal end being connected to the inlet of either one of said fuel pump and said fuel reservoir and positioned adjacent said bottom of said fuel tank, said first longitudinal end being fixed relative to said bottom of said fuel tank, and a float connected to said strainer to elevate said second longitudinal end of said strainer off said bottom of said fuel tank as a fuel level rises in said fuel tank.

* * * * *